United States Patent Office 2,820,772
Patented Jan. 21, 1958

2,820,772

HALOGENATED OLEFIN POLYMERS PLASTICIZED WITH A TELOMER CONTAINING PERFLUOROCHLOROOLEFIN MONOMER UNITS AND METHOD OF PREPARING SAME

William S. Barnhart, Cranford, N. J., assignor, by mesne assignments, to Minnesota Mining and Manufacturing Company, St. Paul, Minn., a corporation of Delaware No Drawing. Application December 30, 1953
Serial No. 401,380

24 Claims. (Cl. 260—33.8)

This invention relates to the plasticization of halogenated olefins. In one of its aspects, this invention relates to novel plasticizers. In another of its aspects, this invention relates to a process for plasticizing halogenated olefins. In one of its more particular aspects, this invention relates to the plasticization of perfluorochloroolefins, such as trifluorochloroethylene.

This application is a continuation-in-part of my prior and copending applications Serial No. 294,495, filed June 19, 1952, now U. S. Patent No. 2,770,659, issued November 13, 1956, and Serial No. 342,743, filed March 16, 1953, in which detailed description of the methods of producing the plasticizers of this invention may be found.

For the purpose of this invention the term telomer means both homotelomers and cotelomers. The term homotelomer refers to those telomeric materials containing the same monomer units. The term cotelomer refers to those telomeric materials containing monomer units of two or more different monomers. The terms polymerization or telomerization in their broadest sense include both homopolymerization and copolymerization, and homotelomerization and cotelomerization, respectively.

By employing suitable techniques, the various halogenated olefins may be polymerized to produce normally solid thermoplastic compounds. These polymerized halogenated olefins have properties which have lead to their widespread acceptance industrially. The properties of these materials may also be modified, thereby extending the range of their utility, by the addition of compounds which soften or plasticize the thermoplastic material. For example, polymers of trifluorochloroethylene have been plasticized by the addition of a low molecular weight polymer of trifluorochloroethylene in the oil, grease or soft wax range which was prepared by thermally cracking the solid polymer of trifluorochloroethylene. Plasticization of trifluorochloroethylene using this low molecular weight polymer, was successful but had many serious disadvantages. These prior art plasticizers had limited compatibility with the perfluorochloroolefin polymer which they were to plasticize, produced a hazy or opaque product, were volatile at moderate temperatures and had poor low temperature characteristics.

It is an object of this invention to provide a plasticizer for halogenated olefin polymers.

It is another object of this invention to provide a plasticizer for polymers of the perfluorochloroolefins which is more compatible than previously available plasticizers.

It is another object of this invention, to provide a plasticizer which improves the low temperature characteristics of the polymer.

It is another object of this invention, to provide a plasticizer which is not readily volatilized at elevated temperatures.

A still further object of this invention, is to provide a plasticizer which improves the physical characteristics of halogenated olefins.

Various other objects and advantages of the present invention will become apparent to those skilled in the art on reading the accompanying description and disclosure.

Generally, the above objects are accomplished by admixing with the polymer that is to be plasticized a quantity of a telomer of trifluorochloroethylene which contains halogen terminal groups. The halogen terminal groups are either chlorine, bromine, or fluorine, preferably chlorine.

The telomeric plasticizers of this invention, are prepared by telomerization in the presence of a sulfuryl halide and have the general formula $W—(X)_n—W$ wherein W is a member selected from the group consisting of fluorine, chlorine and bromine, (X) is a haloolefinic, preferably haloethylenic monomer unit and $n$ is an integer greater than one preferably at least 4 and preferably not more than 20.

The reaction occurs essentially as shown below in a typical reaction using chlorotrifluoroethylene and sulfuryl chloride as an example:

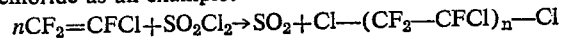

As shown, sulfur dioxide gas is formed as well as a clear polymeric mass, usually in gel-like form, which includes various grades of telomeric halocarbons, such as liquids, oils, greases and soft waxes. These telomeric halocarbons may be separated by conventional distillation. The distillable substances obtained by telomerizing chlorotrifluoroethylenic compounds in the presence of sulfuryl chlorides are sufficiently stable so as not to absorb appreciable amounts of fluorine even though exposed to the gas for 24 hours at a temperature of 60° C. or to significantly pyrolyticly decompose at temperatures up to 200° C.

This invention also contemplates the use of cotelomers of perfluorochloroolefins cotelomerized with other halogenated olefins, such as tetrafluoroethylene, trifluoroethylene, vinyl chloride, vinylidene chloride, vinyl fluoride, vinylidene fluoride, etc. These cotelomers have the general formula $W—(X)_n(Y)_m—W$, wherein W is a member selected from the group consisting of fluorine, chlorine, and bromine, X and Y are different haloolefinic, preferably ethylenic, monomer units and $n$ and $m$ are integers and preferably each is greater than one and each is not greater than 10.

As indicated above, a more detailed description of the process of preparing telomeric compounds may be found in my copending applications. However, a few pertinent examples are presented below:

EXAMPLE 1.—TELOMERIZATION OF CHLOROTRIFLUOROETHYLENE

The pressure system was flushed out with nitrogen and charged with a peroxide solution (3.5 parts of benzoyl peroxide dissolved in 308 parts of carbon tetrachloride) and 135 parts of sulfuryl chloride. The system was cooled to about −25° C. or lower, and 116 parts of chlorotrifluoroethylene monomer was added. The system was closed and heated to about 95° C. for a period of four hours during which time the mixture was mechanically agitated. A maximum gage pressure of 300 pounds per square inch was reached and then gradually subsided. At the end of the telomerization the gases were bled from the system and the liquid product was transferred to a distilling pot. The excess sulfuryl chloride and carbon tetrachloride (solvent) were boiled off by heating the mixture to a pot temperature of 165° C. at atmospheric pressure. The gel-like product was distilled at a vapor temperature up to 175° C. at 35 mm. of mercury to remove very low molecular weight polymers. Final distillation was conducted at 0.5 mm. pressure and at a vapor temperature up to about 230° C. The telomerization yield was 78 percent with 93 percent of the product distilled.

EXAMPLE 2.—PREPARATION OF CHLOROTRIFLUOROETHYLENE PLASTICIZER

This example illustrates the preparation of chlorotrifluoroethylene plasticizer. 57 parts of monomer were telomerized with 41.3 parts of sulfuryl chloride and 1.77 parts of benzoyl peroxide. The product was stripped of low molecular weight components by heating the mixture to a temperature of about 105° C. 51 parts (90 percent yield based on monomer charged) of undistilled product remained. The sample was then heated with 10 weight percent silica, filtered and then stripped again at a temperature of about 150° C. at 20 mm. pressure to give a 62 percent yield of undistilled mixed plasticizer containing the usual pot residue.

In order to compare the relative effectiveness of the various fractions of trifluorochloroethylene telomers when used as plasticizers for polymeric chlorotrifluoroethylene, the data presented in Table I was obtained.

*Table I*
PLASTICIZING EFFICIENCY OF CHLOROTRIFLUOROETHYLENE OIL FRACTIONS
[Composition containing 25 percent plasticizer and 75 percent chlorotrifluoroethylene plastic]

|  | I | II | III | IV | V | VI |
|---|---|---|---|---|---|---|
| Shore durometer hardness D). | 79–80 | 45–47 | 45–46 | 48 | 52–54 | 74–75. |
| Flexual modulus, 25° C | 110,000 | 18,250 | 20,500 | 19,200 |  | 125,000. |
| Appearance | Hazy | Cloudy | Hazy | Clear | Clear | Clear. |
| Bleeding at room temp |  | Yes | Yes | Slight | None | None. |
| Clouding on flexing | No | Yes | No | No | No | No. |

I. These measurements were made upon the original polymeric chlorotrifluoroethylene plastic which contained no plasticizer of any kind.
II. These measurements were made upon the polymeric chlorotrifluoroethylenic plastic which contained a plasticizer consisting of low molecular weight chlorotrifluoroethylenic polymers with extrapolated boiling points of 350° C. to 450° C. at atmospheric pressure (actual measurement 130° C. to 200° C. at 0.5 mm.), which were prepared by pyrolyzing higher molecular weight polymers.
III. These measurements were made upon the polymeric chlorotrifluoroethylene plastic which contained a plasticizer consisting of low molecular weight chlorotrifluoroethylene telomers with extrapolated boiling points of 350° C. to 450° C. at atmospheric pressure (actual measurement 130° C. to 200° C. at 0.5 mm.), which were prepared by telomerizing chlorotrifluoroethylene monomer with sulfuryl chloride.
IV. These measurements were made upon the polymeric chlorotrifluoroethylene plastic which contained a plasticizer consisting of chlorotrifluoroethylene telomers which extrapolated boiling points 300° C. to 550° C. at atmospheric pressure (actual measurement 95° C. to 270° C. at 0.5 mm.), which were prepared by telomerizing chlorotrifluoroethylene monomer with sulfuryl chloride.
V. These measurements were made upon the polymeric chlorotrifluoroethylene plastic which contained a plasticizer consisting of telomeric chlorotrifluoroethylene from which only the light polymer ends boiling below the extrapolated boiling point 300° C. at atmospheric pressure (actual measurement 95° C. at 0.5 mm.) were stripped.
VI. These measurements were made upon the polymeric chlorotrifluoroethylene plastic which contained a plasticizer consisting of telomeric chlorotrifluoroethylene with extrapolated boiling points above 550° C. at atmospheric pressure (actual measurement 270° C. at 0.5 mm.).

The data of Table I compare unplasticized polytrifluorochloroethylene and polytrifluorochloroethylene plasticized with a pyrolyticly produced polytrifluorochloroethylene oil with the same polymer plasticized with various fractions of the product of the telomerization of trifluorochloroethylene using sulfuryl chloride as a telomer. The superiority of the telomer plasticized products is quite apparent. In this connection it should be noted that the various telomer fractions differ somewhat in the physical properties which they impart to the solid polymer.

Generally, the telomer fraction used in composition No. 5 is the fraction which will offer a wider range of utilizable properties. However, other fractions of the telomer oil may be used in special instances where the properties that they impart are desired. For example, the fraction boiling below about 95° C. i. e. between about −20° C. and about 95° C. at 0.5 mm. has been found useful in modifying the molding characteristics of the polymer, while at the same time not altering its physical properties. For example, solid polytrifluorochloroethylene has been admixed with about 25 percent of this low boiling fraction and has been molded at a temperature of about 170° C. This temperature is well below the normal molding temperature of this polymer. Since the telomer fraction is volatile at the molding temperature the end product contained only negligible amounts of plasticizer. Again, the high boiling fraction i. e. boiling above about 250° C. at 0.5 mm. has been used as a fusion aid in the preparation of homogeneous films from a dispersion of solid particulate polytrifluorochloroethylene polymer.

As indicated previously, the telomerization of trifluorochloroethylene with sulfuryl chloride yields distillable products ranging from volatile liquids to hard brittle waxes. The molecular weight of the products varies from about 230 to about 2300 and represents telomers containing from at least 2, and usually about 4, to about 20 monomer units in the chain. All of the telomer chains have chlorine terminal groups. Because the individual fractions may be of special interest in some instances, the data of Table II are presented below. These data represent the significant physical characteristics of the specified fractions of telomer product.

*Table II*
PHYSICAL PROPERTIES OF "KEL-F" OILS

| Telomer oil fraction | Boiling range, °C., at 0.5 mm. | Approx. M. W. | Density | | Viscosity, cs. | | M.P., °F. | Pour pt., °F. |
|---|---|---|---|---|---|---|---|---|
|  |  |  | 100° F. | 210° F. | 68° F. | 130° F. |  |  |
| 1 | −20–95 | 460 | 1.823 | 1.720 | 4.0 |  |  | <−35 |
| 2 | 95–132 | 570 | 1.862 | 1.768 | 12.3 | 3.7 |  | <−35 |
| 3 | 132–170 | 680 | 1.910 | 1.823 | 108 | 14.4 |  | −25 |
| 4 | 170–207 | 800 | 1.940 | 1.853 | ᵃ2.07 | ᵇ8.9 |  | +35 |
| 5 | 207–245 | 1,000 | 1.962 | 1.873 | ᵃ1578 | ᵇ27.2 | 88 | +85 |
| 6 | 245– | >1,600 |  |  |  | ᵇ371.6 | 175 | +165 |

ᵃ At 100° F.
ᵇ At 210° F.

Admixture of the plasticizer with the polymer that is to be plasticized may be accomplished by any of the standard blending techniques. For example, the plasticization may be effected in a ball mill or in other suitable blending equipment. Employing suitable solvents, the plasticizer may be prepared as a solution which is thoroughly admixed with the solid polymer in particulate form with subsequent evaporation of the solvent. Again, the polymer may be polymerized in the presence of the plasticizer. In other words, any process which insures an intimate admixture of the plasticizer may be employed.

As indicated previously, the telomeric plasticizers are more compatible than plasticizers prepared by other processes. For example, oily trifluorochloroethylene polymer prepared by cracking solid polytrifluorochloroethylene is not compatible with solid polymer in an amount above 35 weight percent. Actually, lower concentrations, that is about 25 weight percent, are employed, since there is a tendency to bleed at the higher concentration. The telomeric plasticizer, however, is compatible in an amount up to about 45 or 50 weight percent with only negligible bleeding and may be used under the most adverse conditions in an amount up to about 35 weight percent with no evidence of bleeding. The amount of telomeric plasticizer that may be used is between about 1 and about 45 weight percent preferably between about 10 and about 35 weight percent depending upon the degree of plasticization desired.

The plasticized polymer powder may be molded using the molding techniques described in U. S. Patents 2,617,149, 2,617,150, 2,617,151, and 2,617,152 issued November 11, 1952, to Louis C. Rubin. In this connection it should be noted that the temperature ranges specified in the Rubin patent may be appreciably lowered by using the volatile telomer fraction. When molded according to the procedure of the above described patents, or by other suitable molding techniques, the resultant product is a solid polymer of trifluorochloroethylene having the added plasticizer homogeneously dispersed or incorporated therein. The above cited patents also describe the determination and the significance of, the N. S. T. (no strength temperature) values.

While the use of the telomeric plasticizer has been described with particular reference to the plasticization of perfluorochloroolefins, such as trifluorochloroethylene, it should be noted that other halogenated olefinic polymers which contain at least one substituent other than fluorine may be plasticized with equal success. These other substituents may be chlorine, bromine or hydrogen. Thus, polymers of vinyl fluoride, vinylidene fluoride, vinyl chloride, vinylidene chloride, trifluorochloroethylene and copolymers thereof, have been plasticized with up to about 35 percent of the telomeric plasticizer described herein. Previously some of these halogenated olefins, particularly the vinyl compounds, were plasticized with esters of the phosphates and phthalates, such as tricresyl phosphate and di-butyl phthalate. These polymers, plasticized with this type of plasticizer, were highly subject to chemical attack, have very poor electrical properties and thermal stability. When plasticized with the telomeric plasticizer, these halogenated olefins possess excellent physical and chemical properties. Plasticization of these compounds may be effected either by the addition of the telomeric plasticizer alone or, since the telomeric plasticizers are miscible with ester type plasticizers, by blending a mixture of telomeric plasticizer and ester type plasticizers with the polymer to be plasticized.

For example, 75 weight percent of polyvinyl chloride was admixed with 15 weight percent of tricresyl phosphate and 10 weight percent of the telomeric plasticizer used in the formulation of composition 5 of Table I. This plasticized polymer was then molded and found to possess excellent electrical properties, a high degree of resistance to moisture vapor transmission and an unusual degree of resistance to chemical attack.

The unusual properties of the telomeric plasticizers are believed to be due in part to the presence of the terminal groupings. The presence of added chlorine increases the chlorine content of the plasticizer and renders it more compatible with a wider variety of solid polymeric materials. The following analytical data illustrating the difference between a pyrolyticly produced polymer and telomer is presented below for purposes of information:

| Oil | Percent chlorine | Percent fluorine |
|---|---|---|
| Cracked | 29.3 | 49.2 |
| Telomer | 33.1 | 46.2 |

Since other theories may be advanced as to the superiority of the telomeric products, it is to be understood that this theory is no to be construed as unnecessarily limiting.

Various alterations and modifications of the invention and its aspects may become apparent to those skilled in the art without departing from the scope of this invention.

Having thus described my invention, I claim:

1. A novel composition which comprises a thermoplastic polymer of a halogenated olefin, said halogenated olefin containing at least one substituent from the group consisting of chlorine, bromine and fluorine, provided that no more than 3 fluorine atoms are present in each halogenated olefin used in forming the polymer and an open chain distillable telomer containing a plurality of perfluorochloroolefin monomer units and halogen terminal groups as a plasticizer.

2. The composition of claim 1 wherein the thermoplastic polymer is a polymer of vinyl fluoride.

3. The composition of claim 1 wherein the thermoplastic polymer is a copolymer of vinylidene fluoride and another olefin.

4. The composition of claim 1 wherein the thermoplastic polymer is a polymer of vinyl chloride.

5. The composition of claim 1 wherein the thermoplastic polymer is a polymer of vinylidene chloride.

6. The composition of claim 1 wherein the thermoplastic polymer is a polymer of trifluorochloroethylene.

7. The composition of claim 1 wherein the perfluorochloroolefin is trifluorochloroethylene.

8. A novel composition which comprises a thermoplastic polymer of a halogenated olefin, said halogenated olefin containing at least one substituent from the group consisting of chlorine, bromine and fluorine, provided that no more than 3 fluorine atoms are present in each halogenated olefin used in forming the polymer and as a plasticizer an open chain distillable homo-telomer containing a plurality of perfluorochloroethylene monomer units and halogen terminal groups and having a boiling range between about −20° C. and about 270° C. at 0.5 mm.

9. A novel composition which comprises a thermoplastic polymer of a halogenated olefin, said halogenated olefin containing at least one substituent from the group consisting of chlorine, bromine and fluorine, provided that no more than 3 fluorine atoms are present in each halogenated olefin used in forming the polymer and as a plasticizer an open chain distillable co-telomer containing alternating monomer units of a perfluorochloroethylene and another halogenated olefin and halogen terminal groups and having a boiling range between about −20° C. and about 270° C. at 0.5 mm.

10. The composition of claim 9 wherein the other halogenated olefin is vinyl fluoride.

11. The composition of claim 9 wherein the other halogenated olefin is vinylidene fluoride.

12. The composition of claim 9 wherein the other halogenated olefin is tetrafluoroethylene.

13. The composition of claim 9 wherein the other halogenated olefin is vinylidene chloride.

14. The composition of claim 9 wherein the other halogenated olefin is difluorodichloroethylene.

15. A novel composition which comprises a thermoplastic homopolymer of trifluorochloroethylene having an N. S. T. above about 220° C. and an open chain distillable telomer containing a plurality of trifluorochloroethylene monomer units and chlorine terminal groups and having a boiling range between about −20° C. and about 270° C. at 0.5 mm.

16. A novel composition which comprises a thermoplastic homopolymer of trifluorochloroethylene having an N. S. T. above about 300° C. and an open chain distillable telomer containing a plurality of trifluorochloroethylene monomer units and chlorine terminal groups having a boiling range between about −20° C. and about 95° C. at 0.5 mm.

17. A novel composition which comprises a thermoplastic homopolymer of trifluorochloroethylene having an N. S. T. above about 300° C. and an open chain distillable telomer containing a plurality of trifluorochloroethylene monomer units and chlorine terminal groups having a boiling range between about 95° C. and about 270° C. at 0.5 mm.

18. A novel composition which comprises a thermoplastic polymer of trifluorochloroethylene having an N. S. T. above about 300° C. and an open chain distillable telomer containing a plurality of trifluorochloroethylene monomer units and chlorine terminal groups having a boiling range between about 95° C. and about 200° C. at 0.5 mm.

19. A novel composition which comprises a thermoplastic polymer of trifluorochloroethylene having an N. S. T. above about 300° C. and an open chain distillable telomer containing a plurality of trifluorochloroethylene monomer units and chlorine terminal groups boiling above 250° C. at 0.5 mm.

20. A novel composition which comprises a thermoplastic polymer of trifluorochloroethylene having an N. S. T. above about 300° C. and an open chain distillable telomer containing a plurality of trifluorochloroethylene monomer units and chlorine terminal groups boiling above 95° C. at 0.5 mm.

21. A homogeneous polymer-mass which comprises a thermoplastic halogenated olefin polymer, said halogenated olefin containing at least one substituent from the group consisting of chlorine, bromine and fluorine, provided that no more than 3 fluorine atoms are present in each halogenated olefin used in forming the polymer and dispersed therein in an amount between about 1 and about 45 weight percent a distillable open chain telomer containing a plurality of trifluorochloroethylene monomer units and chlorine terminal groups having a boiling range between about −20° C. and about 270° C. at 0.5 mm.

22. A homogeneous polymer-mass which comprises a thermoplastic trifluorochloroethylene polymer having an N. S. T. above about 220° C. and dispersed therein in an amount between about 1 and about 45 weight percent a distillable open chain telomer containing a plurality of trifluorochloroethylene monomer units and chlorine terminal groups having a boiling range between about −20° C. and about 270° C. at 0.5 mm.

23. A homogeneous polymer-mass which comprises a thermoplastic trifluorochloroethylene homopolymer having an N. S. T. above about 300° C. and dispersed therein in an amount between about 10 and about 35 weight percent a distillable open chain homotelomer containing a plurality of trifluorochloroethylene monomer units and chlorine terminal groups having a boiling range between about −20° C. and about 270° C. at 0.5 mm.

24. A process for plasticizing a thermoplastic polymer of a halogenated olefin, said halogenated olefin containing at least one substituent from the group consisting of chlorine, bromine and fluorine, provided that no more than 3 fluorine atoms are present in each halogenated olefin used in forming the polymer which comprises admixing with said thermoplastic polymer between about 1 and about 45 weight percent of a telomer containing a plurality of trifluorochloroethylene monomer units and halogen terminal groupings having a boiling range between about −20° C. and about 270° C. at 0.5 mm. and molding said admixture under conditions of temperature and pressure such that a homogeneous polymer-mass is produced.

References Cited in the file of this patent
UNITED STATES PATENTS

| | | |
|---|---|---|
| 2,440,800 | Hanford et al. | May 4, 1948 |
| 2,543,530 | Kropa | Feb. 27, 1951 |